(12) United States Patent
Hagemann et al.

(10) Patent No.: US 8,404,333 B2
(45) Date of Patent: Mar. 26, 2013

(54) POLYMER LAYER COMPOSITE FOR A SECURITY AND/OR VALUABLE DOCUMENT

(75) Inventors: Michael Hagemann, Berlin (DE); Arthur Mathea, Berlin (DE); Oliver Muth, Berlin (DE); Malte Pflughoefft, Berlin (DE); Jörg Fischer, Berlin (DE); Heinz Pudleiner, Krefeld (DE)

(73) Assignee: Bundesdruckerei GmbH (DE)

( * ) Notice: Subject to any disclaimer, the term of this patent is extended or adjusted under 35 U.S.C. 154(b) by 0 days.

(21) Appl. No.: 12/746,627

(22) PCT Filed: Dec. 8, 2008

(86) PCT No.: PCT/DE2008/002013
§ 371 (c)(1),
(2), (4) Date: Jul. 2, 2010

(87) PCT Pub. No.: WO2009/071067
PCT Pub. Date: Jun. 11, 2009

(65) Prior Publication Data
US 2010/0260985 A1 Oct. 14, 2010

(30) Foreign Application Priority Data
Dec. 7, 2007 (DE) .......... 10 2007 059 747

(51) Int. Cl.
*B42D 15/10* (2006.01)
*B32B 3/00* (2006.01)
*B32B 5/00* (2006.01)
*B32B 7/00* (2006.01)
*B32B 37/00* (2006.01)
*G03G 7/00* (2006.01)

(52) U.S. Cl. ..... 428/204; 428/195.1; 283/72; 156/272.8
(58) Field of Classification Search ............... 428/195.1; 283/72
See application file for complete search history.

(56) References Cited

U.S. PATENT DOCUMENTS
2,970,131 A 1/1961 Moyer et al.
2,991,273 A 7/1961 Hechelhammer et al.
(Continued)

FOREIGN PATENT DOCUMENTS
DE 1570703 2/1970
DE 2063050 7/1972
(Continued)

OTHER PUBLICATIONS
"Chemistry and Physics of Polycarbonates", Hermann Schnell, Interscience Publishers, 1964, pp. 27-98.
(Continued)

*Primary Examiner* — Mark Ruthkosky
*Assistant Examiner* — Laura C Dettinger
(74) *Attorney, Agent, or Firm* — Ann Wieczorek; Mayer & Williams PC (57) ABSTRACT

The invention relates to a method for producing a polymer layer composite that comprises a plurality of polymer layers and at least one polymer layer contains a laser-sensitive component, said method consisting of the following steps: A) first personalized information is applied to at least one of the polymer layers by means of an inkjet printing method as a colored inkjet printed layer, B) the polymer layer with the colored inkjet printed layer is then joined to the other polymer layers, the polymer layer with the colored inkjet printed layer being arranged between two other polymer layers, C) second personalized information is inscribed into the polymer layer composite obtained in step B) by means of laser engraving. The invention also relates to a thus obtained polymer layer composite, a security and/or valuable document comprising a polymer layer composite of said type and to a method for producing a security and/or valuable document of said type.

21 Claims, 3 Drawing Sheets

U.S. PATENT DOCUMENTS

| | | | |
|---|---|---|---|
| 2,999,846 | A | 9/1961 | Schnell et al. |
| 3,028,365 | A | 4/1962 | Schnell et al. |
| 3,062,781 | A | 11/1962 | Bottenbruch et al. |
| 3,148,172 | A | 9/1964 | Fox et al. |
| 3,271,367 | A | 9/1966 | Schnell et al. |
| 3,275,601 | A | 9/1966 | Schnell et al. |
| 5,648,414 | A * | 7/1997 | Bier et al. ............ 524/323 |
| 6,022,429 | A | 2/2000 | Hagstrom |
| 6,264,296 | B1 | 7/2001 | Klinefelter et al. |
| 6,685,312 | B2 | 2/2004 | Klinefelter et al. |
| 6,932,527 | B2 | 8/2005 | Pribula et al. |
| 6,979,141 | B2 | 12/2005 | Karts et al. |
| 7,037,013 | B2 | 5/2006 | Klinefelter et al. |
| 7,278,580 | B2 * | 10/2007 | Jones et al. ............ 235/488 |
| 2003/0183695 | A1 * | 10/2003 | Labrec et al. ............ 235/487 |
| 2004/0011874 | A1 * | 1/2004 | Theodossiou et al. ........ 235/488 |
| 2005/0095408 | A1 * | 5/2005 | LaBrec et al. ............ 428/195.1 |
| 2005/0247794 | A1 | 11/2005 | Jones et al. |

FOREIGN PATENT DOCUMENTS

| | | |
|---|---|---|
| DE | 2063052 | 7/1972 |
| DE | 2211956 | 10/1973 |
| DE | 2907004 | 8/1980 |
| DE | 3151407 | 10/1983 |
| DE | 3832396 | 2/1990 |
| DE | 4134539 | 4/1993 |
| DE | 19949945 | 8/2001 |
| DE | 10036505 | 8/2003 |
| DE | 10339065 | 4/2005 |
| EP | 0219011 | 4/1987 |
| FR | 1561518 | 3/1969 |
| WO | 0227647 | 4/2002 |
| WO | 2005058608 | 6/2005 |
| WO | 2005098746 | 10/2005 |
| WO | 2006102700 | 10/2006 |

OTHER PUBLICATIONS

"Optical Document Security", Rudolf L. Van Renesse, Artech House, 2005, pp. 1-366 (Document in 4 Parts).

"Dyes, General Survey", Booth et al., Ullmann's Encyclopedia of Industrial Chemistry, Wiley-VCH Verlag GmbH & Co., 2002, Article Online Posting Date: Jun. 15, 2000, pp. 1-61.

"Paints and Coatings", Stoye et al., Ullmann's Encyclopedia of Industrial Chemistry, Wiley-VCH Verlag GmbH & Co., 2006, Article Online Posting Date: Dec. 15, 2006, pp. 1-216 (Document in 2 Parts).

"Imaging Technology", Winkelman et al., Ullmann's Encyclopedia of Industrial Chemistry, Wiley-VCH Verlag GmbH & Co., 2003, Article Online Posting Date: Mar. 15, 2003, pp. 1-116.

"Pigments, Organic", Hunger et al., Ullmann's Encyclopedia of Industrial Chemistry, Wiley-VCH Verlag GmbH & Co., 2002, Article Online Posting Date: Jun. 15, 2000, pp. 1-66.

"Pigments, Inorganic, 1. General", Hans G. Volz, Ullmann's Encyclopedia of Industrial Chemistry, Wiley-VCH Verlag GmbH & Co., 2009, Article Online Posting Date: Oct. 15, 2009, pp. 1-38.

"Pigments, Inorganic, 2. White Pigments", Auer et al., Ullmann's Encyclopedia of Industrial Chemistry, Wiley-VCH Verlag GmbH & Co., 2009, Article Online Posting Date: Oct. 15, 2009, pp. 1-40.

"Pigments, Inorganic, 3. Colored Pigments", Buxbaum et al., Ullmann's Encyclopedia of Industrial Chemistry, Wiley-VCH Verlag GmbH & Co., 2009, Article Online Posting Date: Oct. 15, 2009, pp. 1-49.

"Pigments, Inorganic, 4. Magnetic Pigments", Leitner et al., Ullmann's Encyclopedia of Industrial Chemistry, Wiley-VCH Verlag GmbH & Co., 2009, Article Online Posting Date: Oct. 15, 2009, pp. 1-8.

"Pigments, Inorganic, 5. Anticorrosive Pigments", Gunter Etzrodt, Ullmann's Encyclopedia of Industrial Chemistry, Wiley-VCH Verlag GmbH & Co., 2009, Article Online Posting Date: Oct. 15, 2009, pp. 1-22.

"Pigments, Inorganic, 6. Luster Pigments", Pfaff et al., Ullmann's Encyclopedia of Industrial Chemistry, Wiley-VCH Verlag GmbH & Co., 2009, Article Online Posting Date: Oct. 15, 2009, pp. 1-17.

"Pigments, Inorganic, 7. Transparent Pigments", Harald Gaedcke, Ullmann's Encyclopedia of Industrial Chemistry, Wiley-VCH Verlag GmbH & Co., 2009, Article Online Posting Date: Oct. 15, 2009, pp. 1-5.

* cited by examiner

POLYMER LAYER COMPOSITE FOR A SECURITY AND/OR VALUABLE DOCUMENT

FIELD OF THE INVENTION

The invention relates to a method for producing a polymer layer composite that comprises a plurality of polymer layers wherein at least one polymer layer contains a laser-sensitive component, and wherein (a) first personalized information is applied to at least one of the polymer layers by means of an inkjet printing method as a colored inkjet printed layer, (b) second personalized information is inscribed into the obtained polymer layer composite by means of laser engraving, and (c) the polymer layer with the colored inkjet printed layer is joined to the other polymer layers. The invention also relates to a polymer layer composite obtained thereby, a security and/or valuable document comprising a polymer layer composite of said type, and to a method for producing a security and/or valuable document of said type.

PRIOR ART AND BACKGROUND OF THE INVENTION

Personalization of a security and/or valuable document is a process, wherein personalized information, i.e., individual information for a certain person which is intended as being for the holder or owner of the security and/or valuable document, for instance picture information (such as passport photograph, finger print etc.), sequences of characters (such as name, address, place of residence etc.), is applied to or in the respective security and/or valuable document. This may take place, for example, in the form of colored or black and white imprints or laser engraving. Alternatively or additionally, this or other information for an individual person may, however, also be stored in an electronic circuit integrated in the security and/or valuable document, and then the electronic circuit or the information contained therein can be read by authorized persons.

The personalization can be made in a centralized manner or in a decentralized manner. In the centralized personalization option, the personalized information is determined and transmitted to a manufacturer of the security and/or valuable document. The latter then applies the personalized information in or on the security and/or valuable document during the production and completion thereof. In the decentralized personalization option, the manufacturer of the security and/or valuable document supplies a non-personalized blank to a location, which carries out the determination of the personalized information and applies it on or in the blank, thus completing the formation of the security and/or valuable document. If applicable a final application of an uppermost protective film may be used.

From the patent documents DE 2 907 004 C2, DE 3 151 407 C1 and EP 0 219 011 B1, different methods for laser marking of security and/or valuable documents are known in the art. By such methods, personalized information can be integrated in internal layers of a security and/or valuable document, thus providing protection very well against manipulations. However, by means of this method the integration of colored personalized information, such as, e.g., of passport photographs, is not possible.

From the patent documents U.S. Pat. No. 6,685,312; U.S. Pat. No. 6,932,527; U.S. Pat. No. 6,979,141; U.S. Pat. No. 7,037,013; U.S. Pat. No. 6,022,429 and U.S. Pat. No. 6,264,296, different methods for producing security and/or valuable documents are known in the art, wherein an inkjet printed layer is applied to a completed blank and then if, applicable, a protective paint is applied and the inkjet printed layer is protected against mechanical and/or chemical damages or manipulations. These methods are, therefore, basically suited for the decentralized personalization option. By these methods colored personalized information can be applied to the security and/or valuable document, however, in case of the decentralized option a later application of a protective paint or protective film is required which is an expensive matter. Further, the resulting very superficial arrangement does, not however, provide sufficient security against manipulations of the personalized information, particularly when the latter is removed for unauthorized purposes and used elsewhere or replaced; and then the destruction of the protective paint or film only occurs and they can be replaced if applicable.

TECHNICAL OBJECT OF THE INVENTION

It is the technical object of the invention to provide a method for producing a polymer layer composite for a security and/or valuable document, wherein colored personalized information is protected with a high degree of security against manipulations, and which can be carried out.

BASICS OF THE INVENTION AND PREFERRED EMBODIMENTS

For achieving this technical object, the invention teaches a method for producing a polymer layer composite that comprises a plurality of polymer layers wherein at least one polymer layer contains a laser-sensitive component. The method consists of the following steps: A) first personalized information is applied to at least one of the polymer layers by means of an inkjet printing method as a colored inkjet printed layer, B) the polymer layer with the colored inkjet printed layer is then joined to the other polymer layers, the polymer layer with the colored inkjet printed layer being arranged between two other polymer layers, and C) second personalized information is inscribed into the polymer layer composite obtained in step B) by means of laser engraving.

The invention provides that first personalized information is integrated in color in the security and/or valuable document and is not merely imprinted. Thereby, a very high degree of security against manipulation is obtained, since a manipulation will require a decomposition of the polymer layer composite without destruction of a colored inkjet printed layer, which is practically impossible.

Typically the joining process is a lamination step, and the different polymer layers are basically materially joined with each other. It is, therefore, not necessary to apply a protective layer on the completed composite, which appreciably simplifies production.

In particular, the following is noted with regard to the joining process. As a matter of principle, the step of compilation of the different polymer layers precedes the joining process. The compilation can take place in all usual ways, continuously, quasi-continuously or discontinuously. In a so called roll-to-roll production (continuous compilation), all the polymer layers can be guided parallel to each other, so that only when inserting a roll, the accuracy of fit of all tracks is important. After inserting and starting, an automatic monitoring of the running accuracy of the tracks and an automatic correction is performed, so that the different polymer layers always move in a given and defined position with regard to each other. Thereafter, a lamination of the positioned tracks takes place, with the lamination of rolls being a particularly efficient and fast method. Alternatively, the lamination of single sheets (discontinuous compilation) can also be used. A single sheet contains different sections of a polymer layer, which are assigned to different security and/or valuable documents, or consists thereof. Finally, individual lamination can be employed for a document. Also, for example, electronic circuits can be tested for proper operation and inkjet printed layers can be tested for freedom from faults, before the respective polymer layers are compiled. Thereby rejects are minimized since only tested polymer layers are compiled and then joined with each other. There is no need to re-manufacture all polymer layers if one of the polymer layers is faulty. When compiling in a quasi-continuously manner, individual layers of the polymer layer composite are joined at one position. A special aspect is that the feed of the roll as well as of a single sheet can be made from a stack; also not only a strictly parallel operation but also a crosswise operation is possible.

In a further method the compilation takes place in a combined roll-to-roll and single sheet process. Therein an electronic inlay can be fed as a single sheet and the polymer cover layers can be fed from the roll.

When joining, the different polymer layers are connected to a monolithic composite. This lamination may take place at temperatures from 140 to 270° C., preferably 140 to 210° C., and pressures (specific pressure directly at the workpiece) from 1 to 10 bars, in particular 3 to 7 bars.

After step B) (and before or after step C)), an optical inspection may take place in order to detect faults in joining. Further, the accuracy of fit of the different polymer layers can be examined.

After step B) or after step C), typically a separation of the security and/or valuable documents is carried out, if it is not a single-unit production. Such a separation can be carried out by cutting or stamping.

In an improvement of the invention, one of the polymer layers contains an electronic circuitry (either overlying or embedded), which may also include electronic circuits, and a third personalized information is stored in the electronic circuitry before, in particular immediately before, at the same time as or after step C). It is useful if this polymer layer has on the side with the electronic circuitry and/or on the side opposite to the side with the electronic circuitry, at least in the area of the chip, a preferably opaque overprint. Thereby, the electronic circuitry can be protected against light irradiation, or a converter layer according to document EP 4106463 can be integrated.

The polymer layer with the laser-sensitive component and the polymer layer with the colored inkjet printed layer may be identical or different, i.e. the inkjet printed layer may be applied to the polymer layer with the laser-sensitive component or to another polymer layer. The polymer layer with the electronic circuitry may, but not necessarily, be different from the polymer layer or the polymer layers with the inkjet printed layer and/or the laser-sensitive component.

In step A, a personalized colored inkjet printed layer can be applied to two or more different polymer layers. It is also possible to apply colored inkjet printed layers to both of the opposite sides of a polymer layer. The colored inkjet printed layers on different polymer layers can optionally respectively represent partial information of first personalized information and optionally be arranged complementarily and accurately to register with respect to each other. In other words, the different inkjet printed layers represent partial pictures of an overall picture.

In a particularly preferred variant of the invention, the first personalized information is the color portion of personalized overall picture information and the second personalized information is the black portion of the personalized overall picture information. Herein, the overall picture information is only produced by the inkjet printed layer as well as the laser engraving process, and the inkjet printed layer represents a first partial picture and the laser engraving represents a second partial picture of the overall picture information. It is understood that the partial pictures have to be produced or applied exactly to register with respect to each other.

Optionally, an optical inspection of the colored inkjet printed layer or of the colored inkjet printed layers and/or an electronic test of the electronic circuit can be made before step B), in particular immediately before step B).

One or several of the polymer layers may additionally be provided on one side or both sides with a printed layer, which has been applied by a non-inkjet printing technology. Thereto belong the classic printing methods such as relief printing (direct and indirect), lithographic printing in the versions offset printing, wet and waterless printing, screen printing (silkscreen), digital and in particular intaglio and photogravure.

The invention further relates to a polymer layer composite that can be obtained by the method of the invention. It may be a web, a sheet or an individual card. A web and a sheet each contain a plurality of fields and every field forms a security and/or valuable document after separation. Such a polymer layer composite comprises a plurality of polymer layers; between two polymer layers a colored inkjet printed layer produced by means of inkjet printing with first personalized information is placed, and in one of the polymer layers, containing a laser-sensitive component, second personalized information produced by means of laser engraving is placed. The explanations with regard to the method described above apply in an analogous manner.

Typically, the first personalized information or the personalized overall picture information will be a picture representation, in particular a passport photograph of a person.

The second personalized information may contain a personalized sequence of characters or consist thereof. This may, for example, be the name of the person, the date of birth, and/or the address etc. The second personalized information may, however, also comprise document-individual information, as for instance serial number or date of issue, or consist thereof.

The polymer layer composite may contain 9 to 15, 3 to 14 or, in particular, 5 to 12 polymer layers or the polymer layer composite may consist of these layers. The polymer layers without the electronic circuitry have, for example, a thickness in the range of from 5 to 270 µm, preferably from 10 to 120 µm, and, most preferably, from 20 to 120 µm. The polymer layer with the electronic circuitry has, for example, a thickness from 50 to 650 µm, for example, in the case of a chip module as an electronic circuitry from 150 to 650 µm, or in the case of a display module from 50 to 600 µm, or in the case of a thinned flex chip from 50 to 200 µm.

In principle, all polymer materials being common in the field of security and/or valuable documents can be used as materials for the polymer layers. The polymer materials may be, identical or different, based on a polymer material from the group consisting of PC (polycarbonate, in particular bisphenol A polycarbonate), PET (polyethylene glycol terephthalate), PMMA (polymethyl methacrylate), TPU (thermoplastic polyurethane elastomers), PE (polyethylene), PP (polypropylene), PI (polyimide or poly-trans-isoprene), PVC (polyvinyl chloride) and copolymers of such polymers. Preferred is the use of PC materials and, for example, for the polymer cover layer in particular so-called low-Tg materials can, for example, be used but are not required. This is true in particular for the polymer layer on which the inkjet printed layer is placed and/or for the polymer layer, which is con- nected with the polymer layer that carries the inkjet printed layer and on the side with the inkjet printed layer. Low-Tg materials are polymers, the glass temperature of which is below 140° C. It is preferred that the basic polymer layer of the at least one of the polymer layers to be connected contains identical or different groups being reactive with each other, and at a lamination temperature of less than 200° C. reactive groups of a first polymer layer react with each other and/or with reactive groups of a second polymer layer. Thereby the lamination temperature can be reduced without the tight bond of the laminated layers being at risk. This is caused by the fact that in the case of the different polymer layers with reactive groups and the reaction of the respective reactive groups, the different polymer layers cannot easily be delaminated anymore. There is a reactive coupling between the layers, so to speak a reactive lamination. Secondly, because of the lower lamination temperature a change of the colored inkjet printed layer, in particular a color change, is prevented. It is preferred that the glass temperature Tg of the at least one polymer layer before the thermal lamination is less than 120° C. (or even less than 110° C. or less than 100° C.), and that the glass temperature of this polymer layer after the thermal lamination by reaction of reactive groups of the basic polymer of the polymer layer with each other is higher by at least 5° C., preferably by at least 20° C., than the glass temperature before the thermal lamination. Herein, not only a reactive coupling of the layers to be laminated with each other, but rather an increase of the molecular weight and thus of the glass temperature by cross-linkage of the polymer within the layer and between the layers takes place. This additionally makes a delamination difficult, in particular since an attempt of manipulation at the necessary high delamination temperatures will irreversibly damage, e.g., the colors and thus the document will be destroyed. When using such polymer materials, preferably the lamination temperature in step B) is less than 180° C., and preferably less than 150° C. The choice of suitable reactive groups is easy for the man skilled in the art of polymeric chemistry. Exemplary reactive groups are selected from the group consisting of —CN, —OCN, —NCO, —NC, —SH, $S_x$, -Tos, —SCN, —NCS, —H, epoxy (—CHOCH$_2$), —NH$_2$, —NN+, —NN—R, —OH, —COOH, —CHO, —COOR, -Hal (—F, —Cl, —Br, —I), -Me-Hal (Me=at least divalent metal, for instance Mg), —Si(OR)$_3$, —SiHal$_3$, —CH=CH$_2$, and —COR, wherein R may be an arbitrary reactive or non-reactive group, for instance —H, -Hal, C1-C20 alkyl, C3-C20 aryl, C4-C20 aralkyl, each branched or linear, saturated or unsaturated, optionally substituted, or corresponding heterocycles with one or several identical or different heteroatoms N, O or S. Other reactive groups are of course also possible. Thereto belong the reaction partners of a Diels-Alder reaction or of a metathesis. The reactive groups may be bound directly to the basic polymer or may be connected by a spacer group to the basic polymer. Spacer groups may be all spacer groups known to the man skilled in the art of polymeric chemistry. The spacer groups may also be oligomers or polymers, which mediate elasticity, thus reducing the risk of breaking of the security and/or valuable document. The man skilled in the art is familiar with such elasticity-mediating spacer groups which, therefore, do not need to be described here in more detail. Examples of spacer groups are selected from the group consisting of —(CH$_2$)$_n$—, —(CH$_2$—CH$_2$—O)$_n$—, —(SiR2-O)$_n$—, —(C6H4)$_n$—, —(C6H10)$_n$—, C1-C$_n$ alkyl, C3-C$_{(n+3)}$ aryl, C4-C$_{(n+4)}$ aralkyl, each branched or linear, saturated or unsaturated, optionally substituted, or corresponding heterocycles with one or several, identical or different heteroatoms O, N or S with n=1 to 20, preferably 1 to 10. With respect to further reactive groups or possibilities of modification, reference is made to the document "Ullmann's Encyclopaedia of Industrial Chemistry", Wiley Verlag, electronic edition 2006. The term "basic polymer" denotes for the purpose of the above explanations a polymeric structure, which does not carry any reactive groups under the employed lamination conditions. They may be homopolymers or copolymers. However, polymers being modified with respect to the mentioned polymers are also comprised.

For producing the inkjet printed layer, in principle all conventional inks can be used. Preferred is the use of a preparation containing: A) 0.1 to 20 wt. % of a binding agent with a polycarbonate derivative based on a geminally disubstituted dihydroxydiphenyl cycloalkane, B) 30 to 99.9 wt. % of a preferably organic solvent or solvent mixture, C) 0 to 10 wt. %, referred to dry matter, of a colorant or colorant mixture, D) 0 to 10 wt. % of a functional material or of a mixture of functional materials, E) 0 to 30 wt. % additive and/or auxiliary substances, or of a mixture of such substances, the sum of the components A) to E) always being 100 wt. %, as an inkjet printing ink. Such polycarbonate derivatives are highly compatible with polycarbonate materials, in particular with polycarbonates based on bisphenol A, such as for instance Makrofol® films. Furthermore, the polycarbonate derivative used has high-temperature stability and does not show any coloration at temperatures being typical for lamination, up to 200° C. and greater, thereby the use of the low-Tg materials described above is not necessary. In particular, the polycarbonate derivative may contain functional carbonate structure units of Formula (I):

wherein R1 and R2 are each independently selected from hydrogen, halogen (preferably chlorine or bromine), C1-C8 alkyl, C5-C6 cycloalkyl, C6-C10 aryl (preferably phenyl), and C7-C12 aralkyl (preferably phenyl-C1-C4 alkyl, in particular benzyl); m is an integer from 4 to 7, preferably 4 or 5; R3 and R4 are individually selected for each X, and are each independently hydrogen or C1-C6 alkyl; X is carbon and n is an integer greater than 20, such that at least for one atom X, R3 and R4 are each alkyl. It is preferred that at 1 to 2 atoms for X, in particular only at one atom X, R3 and R4 are each alkyl. R3 and R4 may in particular be methyl. The X atoms in alpha position with respect to the diphenyl-substituted C atom (C1) may not be dialkyl-substituted. The X atoms in beta position with respect to C1 may be disubstituted with alkyl. Preferred is m=4 or 5. The poly-carbonate derivative may for instance be based on monomers, such as 4,4'-(3,3,5-tri-methylcyclohexane-1,1-diyl)diphenol, 4,4'-(3,3-dimethylcyclohexane-1,1-diyl)diphenol, or 4,4'-(2,4,4-trimethylcyclopentane-1,1-diyl)diphenol. Such a polycarbonate derivative may, for example, be produced from diphenols of the Formula (Ia) according to document DE 38 32 396.6, whose scope of disclosure is herein explicitly integrated with its complete contents in the scope of disclosure of this description. A diphenol of the Formula (Ia), under formation of homopolycarbonates, as well as several diphenols of the Formula (Ia), under formation of copolycarbonates, can be used (with the meaning of the radicals, groups and parameters being the same as in Formula I):

Furthermore, the diphenols of the Formula (Ia) can also be used in a mixture with other diphenols, for instance with those of Formula (Ib)

for producing high-molecular, thermoplastic, aromatic polycarbonate derivatives.

Suitable other diphenols of Formula (Ib) are those, in which Z is an aromatic radical with 6 to 30 C atoms and which (a) may comprise one or several aromatic nuclei, (b) may be substituted and (c) may contain aliphatic radicals or cycloaliphatic radicals other than those of Formula (Ia) or heteroatoms as bridge members. Examples of the diphenols of Formula (Ib) are: hydroquinone, resorcin, dihydroxy-diphenyls, bi-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, alpha,alpha'-bis-(hydroxyphenyl)-diisopropylbenzenes and the nucleus-alkylated and nucleus-halogenated compounds thereof. These and other suitable diphenols are, e.g., described in the patent documents U.S. Pat. Nos. 3,028,365; 2,999,835; 3,148,172; 3,275,601; 2,991,273; 3,271,367; 3,062,781; 2,970,131; and 2,999,846; in the U.S. Pat. Nos. DE 1,570,703; 2,063,050; 2,063,052; 2,211,956; and FR 1,561,518, and in the monograph "H. Schnell, Chemistry and Physics of Polycarbonates, Interscience Publishers, New York 1964", which herewith are explicitly integrated with their complete contents in the scope of disclosure of this application. Preferred other diphenols are for instance: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, alpha, alpha-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxy-phenyl)-cyclohexane, alpha, alpha-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-pro-pane. Particularly preferred diphenols of Formula (Ib) are for instance: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane. In particular, 2,2-bis-(4-hydroxyphenyl)-propane is preferred. The other diphenols may be used individually as well as in a mixture. The molar ratio of diphenols of Formula (Ia) to the other diphenols of Formula (Ib) also to be used if applicable, should be from 100 mol % (Ia) to 0 mol % (Ib) and 2 mol % (Ia) to 98 mol % (Ib), preferably from 100 mol % (Ia) to 0 mol % (Ib) and 10 mol % (Ia) to 90 mol % (Ib) and, in particular, from 100 mol % (Ia) to 0 mol % (Ib) and 30 mol % (Ia) to 70 mol % (Ib). The high-molecular polycarbonate derivatives from the diphenols of the Formula (Ia), if applicable in a combination with other diphenols, may be produced according to the known polycarbonate production method. The different diphenols may be linked to each other statistically as well as block-wise. The employed polycarbonate derivatives may be branched in a per se known manner. If a branching is desired, this can be achieved in a known manner by condensation of small amounts, preferably amounts between 0.05 and 2.0 mol % (referred to employed diphenols), at three- or more than three-functional compounds, in particular those with three or more than three phenolic hydroxyl groups. Some branching agents with three or more than three phenolic hydroxyl groups are: phloroglucin, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxy-phenyl)-ethane, tri-(4-hydroxyphenyl)-phenyl-methane, 2,2-bis-[4,4-bis-(4-hydroxyphenyl)-cyclohexyl]-propane, 2,4-bis-(4-hydroxyphenyl-isopropyl)-phenol, 2,6-is-(2-hydroxy-5-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-ortho-terephthalic acid ester, tetra-(4-hydroxyphenyl)-methane, tetra-[4-(4-hydroxyphenyl-isopropyl)phenoxy]-methane and 1,4-bis-[4',4''-dihydroxytriphenyl)-methyl]-benzene. Some of the other three-functional compounds are 2,4-dihydroxybenzoic acid, trimesic acid, cyanuric chloride and 3,3-bis-(3-methyl-4-hydroxyphenyl)-2-oxo-2,3-dihydroindole. As chain terminators for the per se known control of the molecular weight of the polycarbonate derivatives mono-functional compounds in usual concentrations may be used. Suitable compounds are, e.g., phenol, tert-butylphenols or other alkyl-substituted phenols. For controlling the molecular weight, in particular, small amounts of phenols of Formula (Ic) are suitable:

wherein R is a branched C8 and/or C9 alkyl radical. It is preferred that in the alkyl radical R the portion of $CH_3$ protons is between 47 and 89% and the portion of the CH and $CH_2$ protons is between 53 and 11%; also preferred is R in an o and/or p position with respect to the OH group, and particularly preferred is an upper limit of the ortho portion of 20%. The chain terminators are in general preferred to be in amounts of 0.5 to 10, preferably 1.5 to 8 mol %, in reference to the employed diphenols. The polycarbonate derivatives may preferably be produced in a per se known manner according to the phase boundary behavior (comp. H. Schnell "Chemistry and Physics of Polycarbonates", Polymer Reviews, Vol. IX, page 33ff., Interscience Publ. 1964). Herein, the diphenols of Formula (Ia) are dissolved in an aqueous alkaline phase. For producing copolycarbonates with other diphenols, mixtures of diphenols of Formula (Ia) and the other diphenols, for instance those of Formula (Ib), are employed. For controlling the molecular weight, chain terminators, e.g., of Formula (Ic) may be added. Then, in the presence of an inert, preferably polycarbonate-dissolving organic phase, a reaction with phosgene according to the method of the phase boundary condensation is carried out. The reaction temperature is between 0° C. and 40° C. The branching agents also used, if applicable, (preferably in an amount of 0.05 to 2.0 mol %) may either be provided with the diphenols in the aqueous alkaline phase or added in a solution with the organic solvent before the phosgenation. Besides the diphenols of Formula (Ia) and, if applicable, other diphenols (Ib), the mono- and/or bis-chlorocarbonic acid esters thereof can also be used which are added in a solution with organic solvents. The amount of chain terminators and of branching agents depends on the molar amount of diphenolate radicals according to Formula (Ia) and, if applicable, Formula (Ib); when also using chlorocarbonic acid esters, the amount of phosgene can be reduced in a known manner. Suitable organic solvents for the chain terminators and, if applicable, for the branching agents and the chlorocarbonic acid esters are for instance methylene chloride, chlorobenzene and, in particular, mixtures of methylene chloride and chlorobenzene. If applicable, the employed chain terminators and branching agents can be dissolved in the same solvent. As an organic phase for the phase boundary polycondensation, for example, methylene chloride, chlorobenzene and mixtures of methylene chloride and chlorobenzene may be used. As an aqueous alkaline phase, for example, NaOH solution may be used. The production of the polycarbonate derivatives according to the phase boundary method can be catalyzed in a conventional way by catalysts such as tertiary amines, in particular tertiary aliphatic amines such as tributylamine or triethylamine; the catalysts can be used in amounts from 0.05 to 10 mol %, in reference to the moles of employed diphenols. The catalysts can be added before starting the phosgenation or during or also after the phosgenation. The polycarbonate derivatives can be produced according to the known method in a homogeneous phase, the so-called "pyridine method" and according to the known melt transesterification method by using, for example, diphenylcarbonate instead of phosgene. The polycarbonate derivatives may be linear or branched; they are homopolycarbonates or copolycarbonates based on the diphenols of Formula (Ia). By the arbitrary composition with other diphenols, in particular with those of Formula (Ib), the polycarbonate properties can be varied in a favorable way. In such copolycarbonates, the diphenols of Formula (Ia) are contained in amounts from 100 mol % to 2 mol %, preferably in amounts from 100 mol % to 10 mol % and in particular, in amounts from 100 mol % to 30 mol %, in reference to the total amount of 100 mol % of diphenol units, in polycarbonate derivatives. The polycarbonate derivative may be a copolymer containing, in particular consisting thereof, monomer units M1 based on Formula (Ib), preferably bisphenol A, and monomer units M2 based on the geminally disubstituted dihydroxydiphenyl cycloalkanes, preferably of 4,4'-(3,3,5-trimethylcyclohexane-1,1-diyl)diphenol, with the molar ratio M2/M1 preferably being greater than 0.3 and, in particular, greater than 0.4, for example, greater than 0.5. It is preferred that the polycarbonate derivative has a mean molecular weight (weight average) of at least 10,000, and preferably in the range of 20,000 to 300,000. The component B may in principle be essentially organic or aqueous. Essentially aqueous means that up to 20 wt. % of the component B) may be organic solvents. Essentially organic means that up to 5 wt. % water may be present in the component B). Preferably, component B contains or consists of a liquid aliphatic, cycloaliphatic, and/or aromatic hydrocarbon, a liquid organic ester, and/or a mixture of such substances. The employed organic solvents are preferably halogen-free organic solvents. These may be, in particular, aliphatic, cycloaliphatic, aromatic hydrocarbons, such as mesitylene, 1,2,4-trimethylbenzene, cumene and solvent naphtha, toluene, xylene; organic esters, such as methyl acetate, ethyl acetate, butyl acetate, methoxypropyl acetate, ethyl-3-ethoxypropionate. Preferred are mesitylene, 1,2,4-trimethylbenzene, cumene and solvent naphtha, toluene, xylene, acetic acid methyl ester, acetic acid ethyl ester, methoxypropyl acetate, ethyl-3-ethoxy propionate. Particularly preferred are: mesitylene (1,3,5-trimethylbenzene), 1,2,4-trimethylbenzene, cumene (2-phenylpropane), solvent naphtha and ethyl-3-ethoxy propionate. A suitable solvent mixture comprises for instance L1) 0 to 10 wt. %, preferably 1 to 5 wt. %, in particular 2 to 3 wt. %, mesitylene, L2) 10 to 50 wt. %, preferably 25 to 50 wt. %, in particular 30 to 40 wt. %, 1-methoxy-2-propyl acetate, L3) 0 to 20 wt. %, preferably 1 to 20 wt. %, in particular 7 to 15 wt. %, 1,2,4-trimethylbenzene, L4) 10 to 50 wt. %, preferably 25 to 50 wt. %, in particular 30 to 40 wt. %, ethyl-3-ethoxy propionate, L5) 0 to 10 wt. %, preferably 0.01 to 2 wt. %, in particular 0.05 to 0.5 wt. %, cumene, and L6) 0 to 80 wt. %, preferably 1 to 40 wt. %, in particular 15 to 25 wt. %, solvent naphtha, the sum of the components L1) to L6) always being 100 wt. %. The polycarbonate derivative typically has a mean molecular weight (weight average) of at least 10,000, preferably from 20,000 to 300,000. The preparation may, in particular, comprise: A) 0.1 to 10 wt. %, in particular 0.5 to 5 wt. %, of a binding agent with a polycarbonate derivative based on a geminally disubstituted dihydroxydiphenyl cycloalkane, B) 40 to 99.9 wt. %, in particular 45 to 99.5 wt. %, of an organic solvent or solvent mixture, C) 0.1 to 6 wt. %, in particular 0.5 to 4 wt. %, of a colorant or colorant mixture, D) 0.001 to 6 wt. %, in particular 0.1 to 4 wt. %, of a functional material or of a mixture of functional materials, E) 0.1 to 30 wt. %, in particular 1 to 20 wt. %, additive and/or auxiliary substances, or of a mixture of such substances. As component C, if a colorant is to be provided, in principle any arbitrary colorant or colorant mixture can be used. Colorants are all color-changing substances. This means these may be dyes (a survey of dyes is found in Ullmann's Encyclopaedia of Industrial Chemistry, Electronic Release 2007, Wiley Verlag, chapter "Dyes, General Survey"), as well as pigments (a survey of organic and inorganic pigments is found in Ullmann's Encyclopaedia of Industrial Chemistry, Electronic Release 2007, Wiley Verlag, chapter "Pigments, Organic" or "Pigments, Inorganic"). Dyes should be soluble or stably dispersible or suspendable in the solvents of component B. Further it is advantageous if the colorant is stable, in particular color-stable at temperatures of 160° C. and greater for a time of more than 5 min. It is also possible that the colorant is subjected to a given and reproducible color change under the processing conditions and is selected correspondingly. Pigments must have, besides the temperature stability, in particular a very fine particle size distribution. In the practice of inkjet printing, this means that the particle size should not be greater than 1.0 μm, since otherwise blockings in the pressure head will occur. Usually nano-scale solid pigments and soluble organic colorants have shown good results. The colorants may be cationic, anionic or neutral. Examples of colorants that can be used for inkjet printing are: Brillantschwarz C.I. No. 28440, Chromogenschwarz C.I. No. 14645, Di-rekttiefschwarz E C.I. No. 30235, Echtschwarzsalz B C.I. No. 37245, Echtschwarzsalz K C.I. No. 37190, Sudanschwarz HB C.I. 26150, Naphtolschwarz C.I. No. 20470, Bayscript® Schwarz Flüssig, C.I. Basic Black 11, C.I. Basic Blue 154, Cartasol® Türkis K-ZL Flüssig, Cartasol® Türkis K-RL Flüssig (C.I. Basic Blue 140), Cartasol Blau K5R Flüssig. Suitable are further e.g. the commercially obtainable colorants Hostafine® Schwarz TS Flüssig (sold by Clariant GmbH Germany), Bayscript® Schwarz Flüssig (C.I. mixture, sold by Bayer AG Germany), Cartasol® Schwarz MG Flüssig (C.I. Basic Black 11, registered trademark of Clariant GmbH Germany), Flexonylschwarz® PR 100 (E C.I. No. 30235, sold by Hoechst AG), Rhodamin B, Cartasol® Orange K3 GL, Cartasol® Gelb K4 GL, Cartasol® K GL, or Cartasol® Rot K-3B. Further, soluble colorants that can be used are anthraquinone, azo, quinophthalone, cumarin, methin, perinone, and/or pyrazole colorants, e.g., obtainable under the trade name Macrolex®. Further, suitable colorants are described in the document Ullmann's Encyclopaedia of Industrial Chemistry, Electronic Release 2007, Wiley Verlag, chapter "Colorants Used in Ink Jet Inks" Well soluble colorants will lead to an optimum integration in the matrix or the binding agent of the printing layer. The colorants can be added either directly as a dye or pigment or as a paste, a mixture of dye and pigment together with an additional binding agent. This additional binding agent should be chemically compatible with the additional components of the preparation. If such a paste is used as a colorant, the amount of component B refers to the colorant without the other components of the paste. These other components of the paste must then be subsumed under component E. When using so-called colored pigments in the scale colors cyan-magenta-yellow and preferably also (soot-) black are used, full-tone color images are possible. The component D comprises substances which by using technical means can immediately be seen by the human eye or by using suitable detectors. These are materials familiar to the man skilled in the art (cf. also van Renesse, Optical Document Security, 3rd ed., Artech House, 2005), which are used for the protection of valuable and security documents. Thereto belong luminescent substances (dyes or pigments, organic or inorganic) such as e.g. photo-luminophores, electroluminophores, anti-Stokes luminophores, fluorophores, but also magnetizable, photo-acoustically addressable or piezoelectric materials. Furthermore, Raman-active or Raman-amplifying materials can be used, the same as so-called barcode materials. Here too the preferred criteria are either the solubility in the component B or for pigmented systems particle sizes <1 µm and temperature stability for temperatures >160° C. as explained with regard to component C. Functional materials can be added directly or via a paste, i.e. mixture with an additional binding agent, which is then a constituent of component E, or the employed binding agent of the component A. The component E comprises the substances normally used for inks in ink jet printing, such as anti-foam agents, set-up agents, wetting agents, tensides, floating agents, drying agents, catayst, light stabilizers, preservation agents, biocides, tensides, organic polymers for viscosity adjustment, buffer systems, etc. Set-up agents are for instance conventional set-up salts. An example is sodium lactate. As biocides may be used all commercially available preservation agents, which are used for inks Examples are Proxel®GXL and Parmetol®A26. Tensides may be all commercially available tensides which are used for inks. Preferred are amphoteric or non-ionic tensides. Of course, however, the use of special anionic or cationic tensides, which do not alter the properties of the dye, is also possible. Examples of suitable tensides are betaines, ethoxylated diols, etc. Examples also are the product series Surfynol® and Tergitol®. The amount of tensides is, for example, selected such that the surface tension of the ink is in the range of from 10 to 60 mN/m, preferably from 20 to 45 mN/m, measured at 25° C. A buffer system may be provided, which stabilizes the pH value in the range from 2.5 to 8.5, in particular in the range from 5 to 8. Suitable buffer systems are lithium acetate, borate buffer, triethanolamine or acetic acid/sodium acetate. A buffer system will in particular, be applied in the case of a substantially aqueous component B. For adjusting the viscosity of the ink, if applicable, water-soluble polymers may be provided. These may be all polymers which are suitable for conventional ink formulations. Examples are water-soluble starch, in particular with an average molecular weight from 3,000 to 7,000; polyvinylpyrolidone, in particular with an average molecular weight from 25,000 to 250,000; polyvinyl alcohol, in particular with an average molecular weight from 10,000 to 20,000; xanthan gum; carboxymethyl cellulose; ethylene oxide/propylene oxide block copolymer, in particular with an average molecular weight from 1,000 to 8,000. An example for the above block copolymer is the product series Pluronic®. The share of biocide, in reference to the total amount of ink, may be in the range from 0 to 0.5 wt. %, preferably from 0.1 to 0.3 wt. %. The amount of tenside, referred to the total amount of ink, may be in the range from 0 to 0.2 wt. %. The amount of set-up agents in reference to the total amount of ink, may be from 0 to 1 wt. %, preferably from 0.1 to 0.5 wt. %. To the auxiliary agents also belong all other components, such as for example, acetic acid, formic acid, n-methylpyrolidone or other polymers from the used dye solution or paste. With regard to substances, which are suitable as component E, reference is made for instance to Ullmann's Encyclopaedia of Chemical Industry, Electronic Release 2007, Wiley Verlag, chapter "Paints and Coatings", section "Paint Additives".

The laser-sensitive component may in principle be a polymer, which can per se be locally pyrolyzed by laser irradiation and thus dyed black. The respective polymer layer may also consist of such a polymer. Suitable polymers are explained in the following in connection with laser-sensitive pigments. The laser-sensitive component may, however, also be a laser-sensitive pigment, which is mixed with the polymer material of the respective polymer layer and is distributed therein. As laser-sensitive pigments, all pigments that are known in the technological field of the security and/or valuable products can be used. They may, for example, be formed from organic polymers, which have a high absorption of the laser radiation, for instance PET, ABS, polystyrene, PPO, polyphenylene sulfide, polyphenylene sulfone, polyimide sulfone. They may however, also be, for example, LCP's. Particularly suitable are micro-milled thermoplastic materials with a very high melting range of more than 300° C. The particle size is typically in the range from 0.01 to 100 µm, in particular 0.1 to 50 µm, and preferably 1 to 20 µm. Furthermore, the polymer particles may contain light sensitive filler materials or pigments, for example, in an amount of 0.1 to 90 wt. %, in reference to the laser-sensitive pigment. They may also be electrically conductive pigments and/or effect pigments and/or dyes, as described above. They may however also be oxides, hydroxides, sulfides, sulfates or phosphates of metals, such as, for example, Cu, Bi, Sn, Zn, Ag, Sb, Mn, Fe, Ni, or Cr. In particular, basic Cu(II)hydroxide phosphate can be employed. For example, a product is mentioned that is formed by heating blue Cu(II)orthophosphate ($Cu_3(PO_4)_2*3H_2O$) to 100 to 200° C. and has the chemical formula $Cu_3(PO_4)_2*Cu(OH)_2$. $Cu_3(PO_4)_2*Cu(OH)_2$. Further suitable copper phosphates are: $Cu_3(PO_4)_2*3Cu(OH)_2$, $Cu_3(PO_4)_2*2Cu(OH)_2*2H_2O$, $4CuO*P_2O_5$, $4CuO*P_2O_5*3H_2O$, $4CuO*P_2O_5*1.5H_2O$ and $4CuO*P_2O_5*1.2H_2O$.

Suitable laser radiation for generating the second personalized information has a wave length in the range from 150 nm to 10,600 nm, in particular 150 nm to 1,100 nm. For instance $CO_2$ lasers (10,600 nm), Nd:YAG lasers (1,064 nm or 532 nm), and pulsed UV lasers (excimer lasers) can be used. The energy density is in general in the range from 0.3 mJ/cm² to 50 mJ/cm², and, in particular, in the range from 0.3 mJ/cm² to 10 mJ/cm².

Further printed layers may be provided on one or several of the polymer layers, said further printed layers being known from the field of the security and/or valuable documents. They may be arranged on one side or on both sides of the polymer layer(s) before joining Such other printed layer may also be applied to the polymer layer with the colored inkjet printed layer, also immediately above or below the inkjet printed layer and/or on the side of the polymer layer which is opposite to the inkjet printed layer. Such printed layers may also comprise functional substances, as explained above with respect to component D).

During step B) it is also possible to integrate or apply, for example, arbitrary diffraction structures, such as line patterns as known for instance from the documents DE 199 49 945 or 100 36 505.

The invention also relates to a security and/or valuable document containing a polymer layer composite according to the invention and optionally a layer or several layers based on paper, Teslin® products and other composite materials.

Examples for security and/or valuable documents are: identity cards, passports, ID cards, access control cards, visas, tickets, driver's licenses, vehicle documents, personalized valuable documents, credit cards, and personalized chip cards. Such security and/or valuable documents typically comprise at least a substrate, a printed layer, and optionally, a transparent cover layer. Substrate and cover layers themselves may be composed of a multitude of layers. A substrate is a carrier structure, to which the printed layer with information, images, patterns and the like is applied. As materials for a substrate, all conventional materials on a paper and/or (organic) polymer basis can be used. Such a security and/or valuable document comprises within the total multi-layer structure a polymer layer composite according to the invention. Besides the polymer layer composite according to the invention, at least one additional printed layer may be provided, which may be applied to an external surface of the polymer layer composite or to an additional layer connected with the polymer layer composite.

Finally, the invention relates to a method for producing a security and/or valuable document according to the invention wherein the polymer layer composite is joined at the same time as or after joining the polymer layers to a layer or several further layers based on paper, Teslin® products and other composite materials, for example, by laminating or gluing.

BRIEF DESCRIPTION OF THE DRAWINGS

In the following, the invention is explained in more detail with reference to embodiments representing examples only. There are.

DETAILED DESCRIPTION OF THE EMBODIMENTS

Example 1

Production Process

Figure 1:
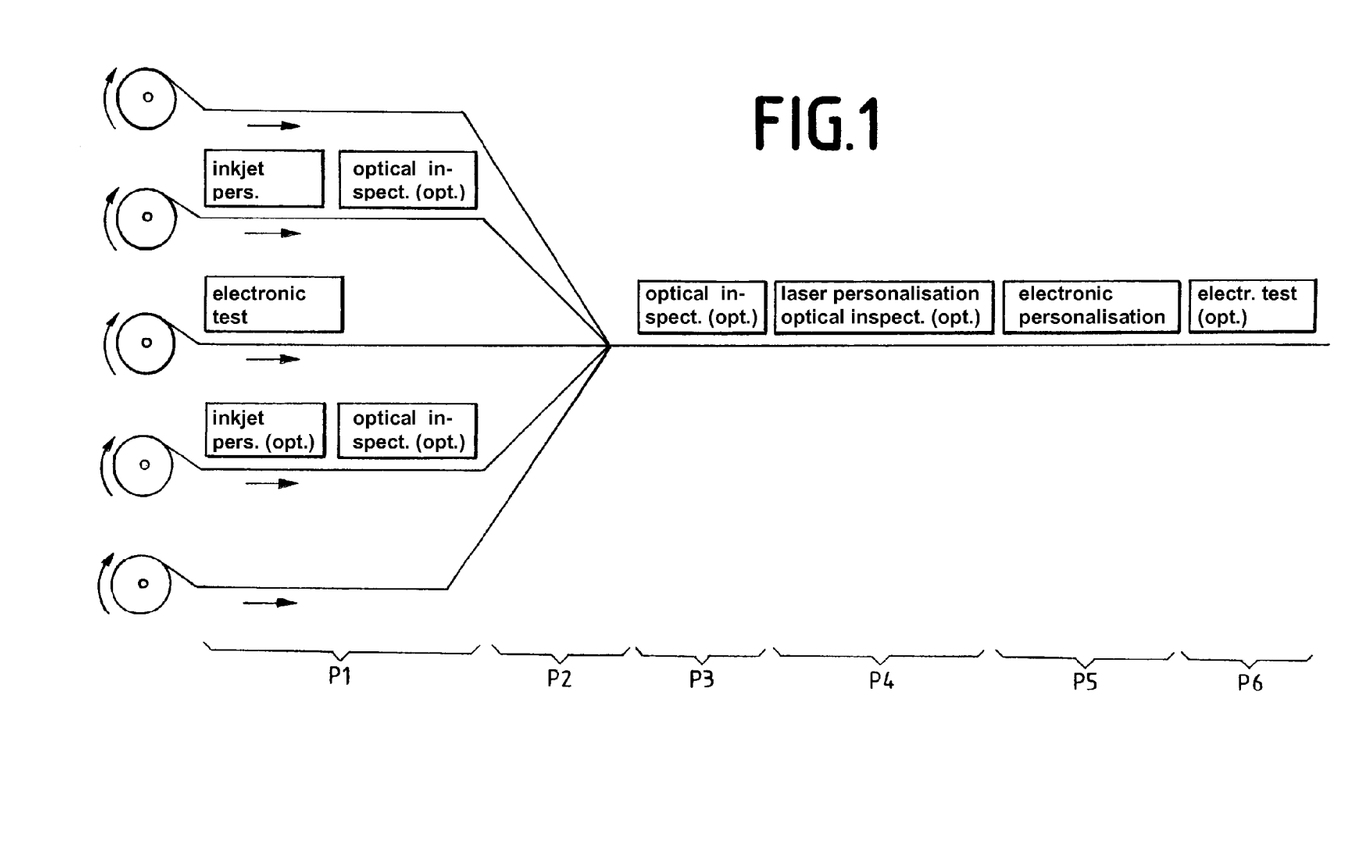
FIG. 1: Process sequence of a first variant of the compiling and joining process of different polymer layers.

FIG. 1 shows a the process of compiling and joining to a polymer layer a composite according to the invention. Five different tracks 1, 2, 3, 4 and 5 can be seen, each being formed from a polymer layer or film. Further tracks can be arranged externally to and/or between the shown tracks in parallel to each other and are not shown here for the sake of clarity. The tracks 1, 2, 3, 4 and 5 may, in particular, be polycarbonate films. The tracks 1, 2, 4, and 5, may be identical or different and may have a thickness from 5 to 270 µm. To at least one of the tracks 2 or 4, optionally to both, a colored inkjet printed layer is applied, which represents a first personalized information. At least one of the layers 1, 2, 3, 4 or 5 may contain a laser-sensitive component. After imprinting and before compiling, optionally a drying process of the inkjet printed layer(s) takes place. On at least one of the polymer layers 1, 2, 3, 4 or 5, a further printed layer of a different printing technology may be placed, for instance iris printing in a relief or offset printing method. The polymer layer 3 contains an electronic circuitry (or several electronic circuitries, which are respectively assigned to a completed security and/or valuable document). The electronic circuitry may, however, also be provided in one of the other layers shown 1, 2, 4 or 5.

In phase P1 the different polymer layers 1, 2, 3, 4 and 5 extend in parallel to each other. To the layer 2 the application of an inkjet printed layer is carried out, optionally followed by an optical inspection of the inkjet printed layer. Further, a test of the electronic circuit in the layer 3 is optionally carried out. If applicable, a second inkjet printed layer can be applied to the layer 4, said second inkjet printed layer being identical to or different from the first inkjet printed layer. Optionally follows in this phase P1 an optical inspection of the second inkjet printed layer. Said inkjet printed layers can be applied independently from each other to one or the other side of the layers 2, 4. In phase P2, the different polymer layers 1, 2, 3, 4 and 5 are compiled and joined by way of lamination. A fixation of the compiled layers to each other before lamination, may for instance be made by means of ultrasonic stitching, but also other stitching methods, such as glue stitching. The lamination may be carried out by all conventional lamination methods, for instance by means of press plates in a combined heating/cooling press or particularly advantageously by means of a roll lamination. In phase P3 optionally an optical inspection for proper joining is carried out. In phase P4 a laser engraving step with the second personalized information and optionally a subsequent optical inspection of the laser engraving is performed. For this purpose, one of the polymer layers 1, 2, 3, 4 or 5 contains a laser-sensitive component, for instance a laser-sensitive pigment. In phase P5 follows an electronic personalization by storage of personalized data in the electronic circuit. In phase P6 optionally an electronic test of the stored data is made.

Example 2

Alternative Production Process

Figure 2:
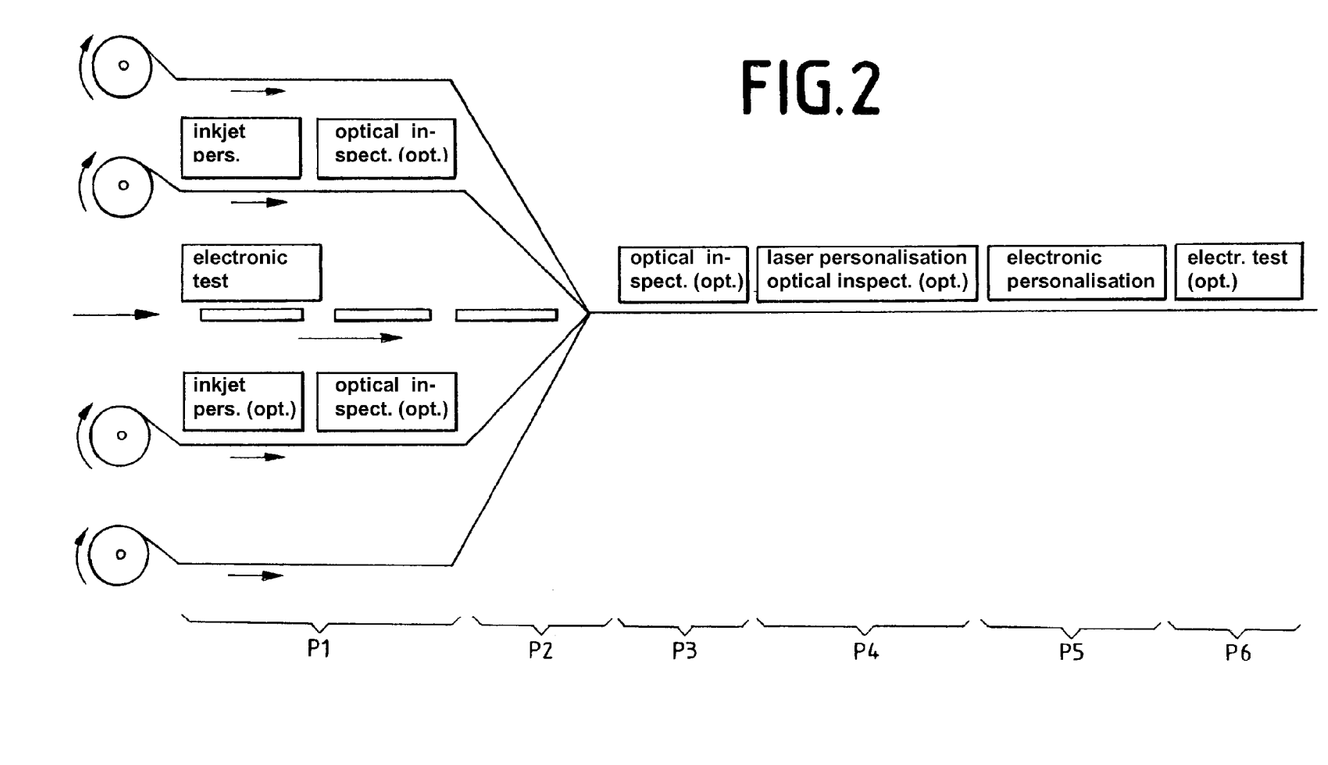
FIG. 2: Process sequence of a second variant of the compiling and joining process of different polymer layers.

FIG. 2 shows an alternative process of compiling and joining to a polymer layer composite according to the invention. 4 different tracks 1, 2, 4 and 5, and a sheet feeder 3 can be seen, which are respectively formed from a polymer layer or film. Further tracks may be arranged externally to and/or between the shown tracks in a parallel orientation and are not shown for the sake of clarity. The tracks or sheets 1, 2, 3, 4 and 5 may, in particular, be polycarbonate films, and the tracks 1, 2, 4, and 5, may be identical or different and may have a thickness of from 5 to 270 µm. To at least one of the tracks 2 or 4, optionally to both, a colored inkjet printed layer is applied, which represents first personalized information. After imprinting and before compiling, optionally a drying process of the inkjet printed layer(s) is carried out. Additionally on at least one of the polymer layers 1, 2, 3, 4 or 5, a printed layer of a different printing technology may be placed, for instance iris flat printing, guilloches. The polymer layer 3 is designed as a sheet and contains an electronic circuitry in a sheet (or several electronic circuitries per sheet, which are respectively assigned to a completed security and/or valuable document). The sheet feeder of the layer 3 may also be exchanged with one of the other layers 1, 2, 4 or 5.

In phase P1, the different polymer layers 1, 2, 3, 4 and 5 extend in parallel to each other. To the layer 2 the application of an inkjet printed layer is carried out, and optionally follows in this phase P1 an optical inspection of the inkjet printed layer. Furthermore, optionally a test of the electronic circuitry in sheet 3 is carried out. If applicable, a second inkjet printed layer can be applied to the layer 4, said second inkjet printed layer being identical to or different from the first inkjet printed layer; and optionally in this phase P1 an optical inspection of the second inkjet printed layer is also carried out. Said inkjet printed layers can be applied respectively independently from each other to one or the other side of the layers 2, 4. As in Example 1, the second inkjet printed layer may represent third personalized information, which is different from first personalized information. In phase P2 the different polymer layers 1, 2, 3, 4 and 5 are compiled and joined by way of lamination. Here it is particularly advantageous that the polymer layer 3 with the integrated optional electronic circuitries is used as sheet 3. This permits a simple orientation of the tracks relative to the sheet. A fixation of the compiled layers with respect to each other may, for example, be carried out by means of ultrasonic stitching, but also by other stitching methods, such as glue stitching. The lamination may be performed by all conventional lamination methods, for instance by means of press plates in a combined heating/cooling press or particularly advantageously by a roll lamination. In phase P3 an optical inspection for proper joining optionally may take place. In phase P4 follows a laser engraving process with the second personalized information. For this purpose one of the polymer layers 1, 2, 3, 4 or 5 contains a laser-sensitive component, for instance a laser-sensitive pigment. In phase P5 an electronic personalization by storage of personalized data in the electronic circuit is made. In phase P6 an electronic test of the stored data is optionally made.

Example 3

First PC ID1 Card

Figure 3:
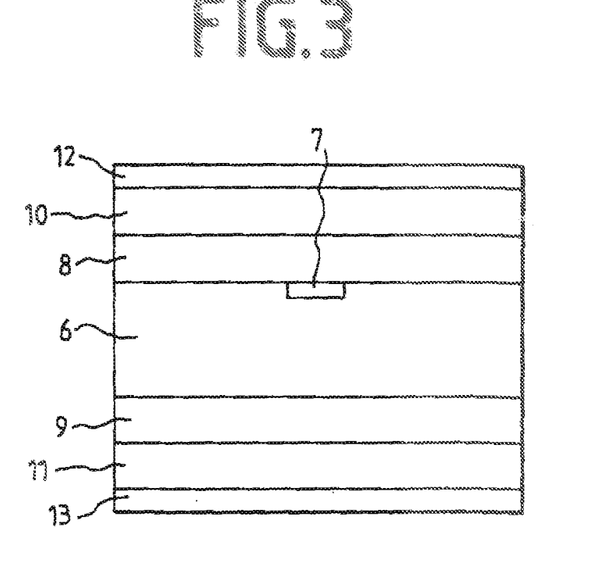
FIG. 3: Structure of a first PC ID1 card.

FIG. 3 shows the layer structure of a polycarbonate identity card. In the middle a polymer layer 6 with an electronic chip 7 and a thickness of 300 μm can be seen. On both sides of the polymer layer 6, 100 μm thick, opaque polymer layers 8 and 9 are placed, which are provided with a printed layer produced by means of a printing technology different from inkjet printing, for instance iris printing in the relief printing or offset printing method. Immediately adjacent and external to the polymer layers 8 and 9, one 100 μm thick, transparent polymer layers 10 and 11 are each placed, with at least one of the polymer layers 10 or 11 carrying an inkjet printed layer. Externally to the polymer layers 10 and 11, one final polymer layer is provided as 12 and 13, which are formed as 50 μm thick, transparent overlay layers.

Example 4

Second PC ID1 Card

Figure 4:
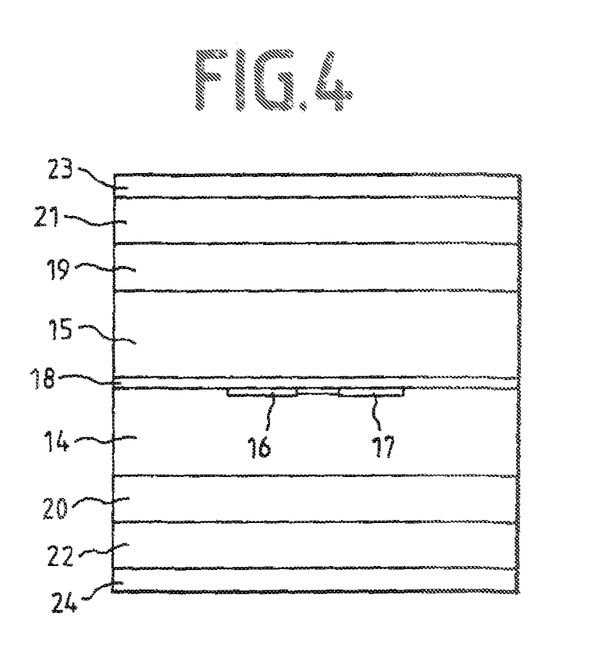
FIG. 4: Structure of a second PC ID1 card.

For FIG. 4 in the middle can be seen two opaque polymer layers 14 and 15 with a thickness of 150 μm A chip 16 with an antenna 17 is applied to one polymer layer 14 and to the side directed toward the polymer. The chip 16 and the antenna 17 are overprinted with a first printed layer 18. Toward the outside are opaque and 100 μm thick polymer layers 19 and 20, which on the respectively external side carry as a background a printed layer of a non-inkjet printing technology, for instance an iris in the flat printing method. Further, toward the outside follow the 100 μm thick and transparent polymer layers 21 and 22, which internally carry an inscription formed as a relief printing layer. The polymer layer 21 comprises an external fluorescent printed layer and the polymer layer 22 comprises an external printed layer with optically variable pigments as well as an inkjet printed layer with personalized information, for instance a passport photograph. The outermost polymer layers 23 and 24 are 50 μm thick and transparent. The polymer layer 23 contains a laser-sensitive component, for instance laser-sensitive pigments. In the polymer layer 23 is inscribed personalized information by means of a laser.

The invention claimed is:

1. A method for producing a polymer layer composite that comprises a plurality of polymer layers wherein at least one polymer layer contains a laser-sensitive component, said method comprising the following steps:

A) applying first personalized information to at least one of the polymer layers by means of an inkjet printing method as a colored inkjet printed layer, wherein the colored inkjet printed layer is made using a preparation comprising 0.1 to 10 wt. % of a binding agent being a polycarbonate derivative according to Formula I, Formula I wherein the preparation comprises 45 to 99.5 wt. % of an organic solvent or a solvent mixture, R1 and R2 are each independently selected from hydrogen, halogen, C1-C8 alkyl, C5-C6 cycloalkyl, C6-C10 aryl, and C7-C12 aralkyl; M is an integer from 4 to 7; R3 and R4 are individually selected for each X, and are each independently hydrogen or C1-C6 alkyl; X is carbon and n is an integer greater than 20, such that at least for one atom X, R3 and R4 each alkyl, B) thereafter joining the polymer layer with the colored inkjet printed layer to the other polymer layers of the plurality of polymer layers, wherein the polymer layer with the colored inkjet printed layer is placed between two other polymer layers, and C) inscribing second personalized information into the polymer layer composite obtained in step B) by means of laser engraving.

2. The method according to claim 1, wherein one of the polymer layers contains an electronic circuitry and wherein third personalized information is stored in the electronic circuitry before or at the same time as or after step C).

3. The method according to claim 1, wherein the polymer layer with the laser-sensitive component and the polymer layer with the colored inkjet printed layer are identical or different.

4. The method according to claim 1, wherein the polymer layer with the electronic circuitry is different from the polymer layer or the polymer layers with the inkjet printed layer and/or laser-sensitive component.

5. The method according to claim 1, wherein step A comprising the step of applying personalized colored inkjet printed layer is applied to two or more different polymer layers.

6. The method according to claim 5, wherein the colored inkjet printed layers on different polymer layers are partial information of the first personalized information and, optionally, are placed complementarily and accurately in registration with each other.

7. The method according to claim 1, wherein the first personalized information is the color portion of personalized overall picture information, and wherein the second personalized information is the black portion of personalized overall picture information.

8. The method according to claim 1, wherein before step B), the method further comprises (a) performing an optical inspection of the colored inkjet printed layer or of the colored inkjet printed layers and/or (b) performing an electronic test of the electronic circuitry.

9. A polymer layer composite that comprises a plurality of polymer layers wherein at least one polymer layer contains a laser component obtained by a method comprising the steps of:

A) applying first personalized information to at least one of the polymer layers having a polycarbonate layer by means of an inkjet printing method as a colored inkjet printed layer, wherein the colored inkjet printed layer is made using a preparation comprising 0.1 to 10 wt. % of a binding agent being a polycarbonate derivative according to Formula I, wherein the preparation comprises 45 to 99.5 wt. % of an organic solvent or a solvent mixture, Formula I wherein R1 and R2 are each independently selected from hydrogen, halogen, C1-C8 alkyl, C5-C6 cycloalkyl, C6-C10 aryl, and C7-C12 aralkyl; M is an integer from 4 to 7; R3 and R4 are individually selected for each X, and are each independently hydrogen or C1-C6 alkyl; X is carbon and n is an integer greater than 20, such that at least for one atom X, R3 and R4 each alkyl, B) thereafter joining the polymer layer of step A with the colored inkjet printed layer to other polymer layers of the plurality of polymer layers, wherein the polymer layer with the colored inkjet printed layer is placed between two other polymer layers, and C) inscribing second personalized information into the polymer layer composite obtained in step B) by means of laser engraving.

10. The polymer layer composite according to claim 9 wherein one of the polymer layers contains an electronic circuitry and wherein third personalized information is stored in the electronic circuitry before or at the same time as or after step C).

11. The polymer layer composite according to claim 10, wherein the polymer layer with the laser-sensitive component and the polymer layer with the colored inkjet printed layer are identical or different.

12. The polymer layer composite according to claim 10, wherein the first personalized information is the color portion of a personalized overall picture information, and wherein the second personalized information is the black portion of the personalized overall picture information.

13. The polymer layer composite according to claim 10, wherein the first personalized information is a picture representation, comprising a passport photograph of a person.

14. The polymer layer composite according to claim 12, wherein personalized overall picture information is a picture representation, comprising a passport photograph of a person.

15. The polymer layer composite according to claim 10, wherein the second personalized information comprises a personalized sequence of characters.

16. The polymer layer composite according to claim 10, comprising 3 to 14 polymer layers.

17. The polymer layer composite according to claim 10, wherein the polymer layers without the electronic circuitry have a thickness in the range from 5 to 270 μm.

18. The polymer layer composite according to claim 10, wherein the polymer layer with the electronic circuitry has a thickness from 50 to 650 μm.

19. The polymer layer composite according to claim 10, wherein the polymer layers are identical or different and comprise a, polyethylene glycol terephthalate, polymethyl methacrylate, thermoplastic polyurethane elastomers, polyethylene, polypropylene, polyimide or poly-trans-isoprene, polyvinyl chloride and copolymers of such polymers.

20. A security and/or valuable document comprising a polymer layer composite according to claim 10.

21. A method for producing a security and/or valuable document according to claim 20, wherein the polymer layer composite is joined at the same time as or after joining the polymer layers to a layer or several further layers comprising paper, and/or other composite materials.

* * * * *